United States Patent
Lu et al.

(10) Patent No.: US 10,885,308 B2
(45) Date of Patent: Jan. 5, 2021

(54) METHOD AND APPARATUS FOR EVALUATING ILLUMINATION CONDITION IN FACE IMAGE

(71) Applicant: FUJITSU LIMITED, Kawasaki (JP)

(72) Inventors: Pingping Lu, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 16/159,031

(22) Filed: Oct. 12, 2018

(65) Prior Publication Data
US 2019/0114468 A1    Apr. 18, 2019

(30) Foreign Application Priority Data

Oct. 16, 2017   (CN) .......................... 2017 1 0970321

(51) Int. Cl.
| G06K 9/00 | (2006.01) |
| G06K 9/46 | (2006.01) |
| G06T 7/11 | (2017.01) |
| G06T 7/90 | (2017.01) |

(52) U.S. Cl.
CPC ....... G06K 9/00248 (2013.01); G06K 9/4661 (2013.01); G06T 7/11 (2017.01); G06T 7/90 (2017.01); *G06K 9/00281* (2013.01); *G06T 2207/30201* (2013.01)

(58) Field of Classification Search
None
See application file for complete search history.

(56) References Cited

U.S. PATENT DOCUMENTS

| 2010/0014775 | A1  | 1/2010  | Ikeda |
| 2016/0267348 | A1* | 9/2016  | Kondo ................. G06K 9/4671 |
| 2017/0195581 | A1* | 7/2017  | Suzuki ................. H04N 5/2351 |
| 2017/0244882 | A1* | 8/2017  | Kitajima .............. G06K 9/4604 |
| 2019/0230281 | A1* | 7/2019  | Ohba ................. H04N 5/23232 |
| 2019/0339485 | A1* | 11/2019 | Nakamura ............. G02B 26/02 |

FOREIGN PATENT DOCUMENTS

EP    2146306 A2    1/2010

OTHER PUBLICATIONS

Extended European Search Report dated Mar. 6, 2019 in related European Patent Application No. 18200090.1 (9 pages).

* cited by examiner

*Primary Examiner* — Fayyaz Alam
(74) *Attorney, Agent, or Firm* — Staas & Halsey LLP

(57) ABSTRACT

A method and apparatus for evaluating an illumination condition in a face image is provided by decomposing a face image into illumination feature components and face feature components; extracting determined areas in the face image; calculating a maximum luminance feature, a minimum luminance feature and an illumination direction feature according to the decomposed illumination feature components in the determined areas. The illumination condition in the face image is evaluated according to the maximum luminance feature, the minimum luminance feature and the illumination direction feature.

19 Claims, 5 Drawing Sheets

METHOD AND APPARATUS FOR EVALUATING ILLUMINATION CONDITION IN FACE IMAGE

CROSS REFERENCE TO RELATED APPLICATION

This application claims priority to Chinese Patent Application No. 201710970321.8 filed on Oct. 16, 2017 and entitled "Method and Apparatus for Evaluating an Illumination Condition in a Face Image," the disclosure of which is incorporated herein by reference in its entirety.

FIELD OF THE INVENTION

The present invention relates generally to the field of image processing technology. More particularly, the present invention relates to a method and apparatus for efficiently evaluating an illumination condition in a face image.

BACKGROUND

In recent years, an increasing number of applications based on face recognition arise along with the development of information technology. For a face recognition system, illumination factors have notable influences on modules of detection, alignment, verification and the like of a face. For example, different illumination conditions, such as different light sources, illumination directions and illumination luminance, have different influences on face recognition. In particular, low luminance, high luminance and lateral light condition will severely damage the performance of the face recognition system.

To solve the foregoing problem, one traditional technique is increasing the number of samples, for example acquiring many face images under different illumination conditions for the same person, so as to increase robustness of face recognition in different illumination environments. However, such a manner notably increases the amount of data, thus increasing not only difficulty in data collection but also difficulty in training a verification module because it would be difficult for the verification module to converge. Another traditional technique is developing a new illumination normalization method, so as to remove illumination components of no interest such that a face image is more regular. However, such a manner needs a larger calculation amount, thus lowering the timeliness of the system, and besides, the related model shall be re-trained for adaptation to new characteristics of the face image which result from the new illumination normalization method.

To solve the foregoing problem while making it possible to avoid deficiencies of the traditional techniques and simply and efficiently avoid interference to the face recognition system due to a face image in which an illumination condition is worse, it is possible to evaluate an illumination condition in a face image and feed an evaluation result back to a user or to directly remove a face image in which an illumination condition is not ideal. In this way, a recognition rate of the face recognition system can be increased, so as to improve the user friendliness of the face recognition system through interactions with the user.

Therefore, the present invention is aimed at efficiency evaluating an illumination condition in a face image so as to facilitate face recognition.

SUMMARY OF THE INVENTION

A brief summary of the present invention is given below to provide a basic understanding of aspects of the present invention. It should be understood that the summary is not exhaustive; it does not intend to define a key or important part of the present invention, nor does it intend to limit the scope of the present invention. The object of the summary is only to briefly present some concepts, which serves as a preamble of the detailed description that follows.

An object of the present invention is to propose a method and apparatus capable of efficiently evaluating an illumination condition in a face image.

To achieve the foregoing object, according to an aspect of the present invention, there is provided a method for evaluating an illumination condition in a face image, the method comprising: decomposing a face image into illumination feature components and face feature components; extracting predetermined areas in the face image; calculating a maximum luminance feature, a minimum luminance feature and an illumination direction feature according to illumination feature components in the predetermined areas; and evaluating the illumination condition in the face image according to the maximum luminance feature, the minimum luminance feature and the illumination direction feature.

According to another aspect of the present invention, there is provided an apparatus for evaluating an illumination condition in a face image, the apparatus comprising: a decomposing device configured to: decompose a face image into illumination feature components and face feature components; an extracting device configured to: extract predetermined areas in the face image; a calculating device configured to: calculate a maximum luminance feature, a minimum luminance feature and an illumination direction feature according to illumination feature components in the predetermined areas; and an evaluating device configured to: evaluate the illumination condition in the face image according to the maximum luminance feature, the minimum luminance feature and the illumination direction feature.

In addition, according to another aspect of the present invention, there is further provided a storage medium. The storage medium comprises machine readable program codes that, when executed on an information processing apparatus, cause the information processing apparatus to implement the foregoing method according to the present invention.

Moreover, according to yet another aspect of the present invention, there is further provided a program product. The program product comprises machine executable instructions that, when executed on an information processing apparatus, cause the information processing apparatus to implement the foregoing method according to the present invention.

BRIEF DESCRIPTION OF THE DRAWINGS

The foregoing and other objects, features and advantages of the present invention will be understood more easily with reference to the description of the present invention given in conjunction with the drawings hereinafter. The components in the drawings aim only to show the principle of the present invention. The same or similar technical features or components will be denoted with the same or similar reference signs throughout the drawings. In the drawings.

DETAILED DESCRIPTION OF THE INVENTION

Figure 1:
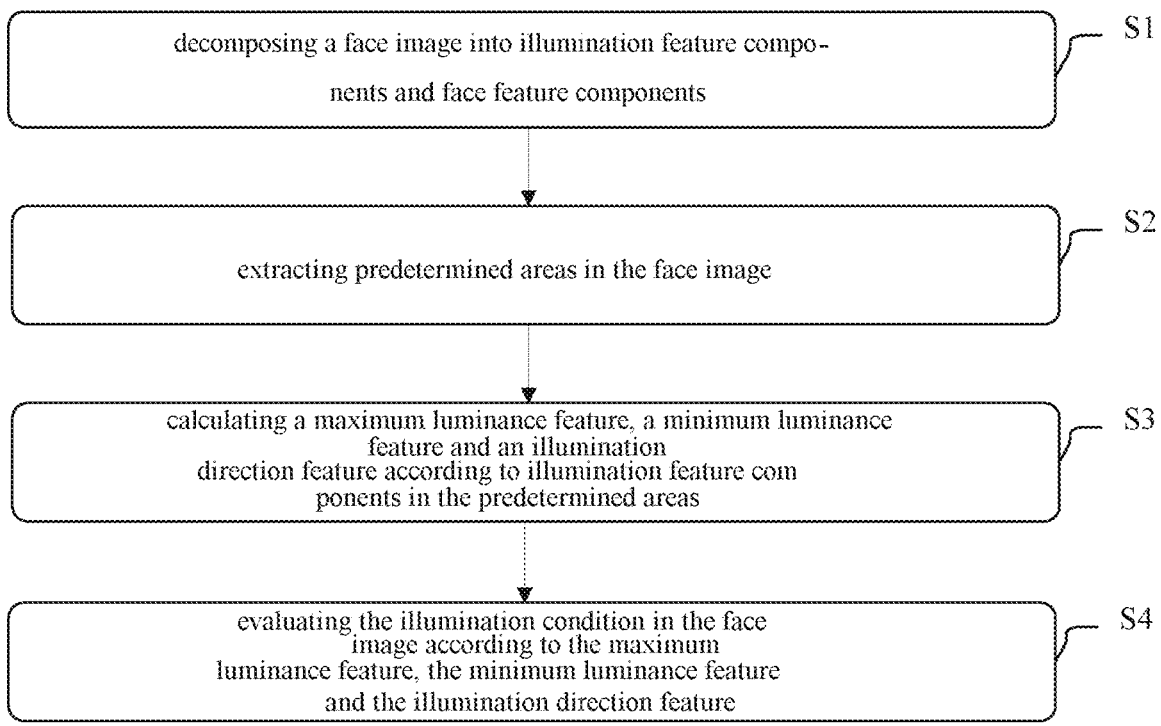
FIG. 1 shows a flow chart of a method for evaluating an illumination condition in a face image according to an embodiment of the present invention.

Exemplary embodiments of the present invention will be described in detail hereinafter in combination with the drawings. For the sake of clarity and conciseness, the description does not describe all of the features of actual embodiments. However, it should be understood that in developing any such actual embodiment, many decisions specific to the embodiments must be made, so as to achieve specific objects of a developer; for example, those limitation conditions related to system and services are met, and these limitation conditions possibly will vary as embodiments are different. In addition, it should be appreciated that although developing tasks are possibly complicated and time-consuming, such developing tasks are only routine tasks for those skilled in the art benefiting from the contents of the present disclosure.

It should also be noted herein that, to avoid the present invention from being obscured due to unnecessary details, only those device structures and/or processing steps closely related to the solution according to the present invention are shown in the drawings, while omitting other details not closely related to the present invention. In addition, it should also be noted that, elements and features described in one figure or one embodiment of the present invention may be combined with elements and features shown in one or more other figures or embodiments.

In the present invention, an illumination condition as an evaluation object mainly includes two aspects, i.e., illumination quantity and illumination direction.

The flow chart of a method for evaluating an illumination condition in a face image according to an embodiment of the present invention will be described with reference to FIG. 1 hereinafter.

FIG. 1 shows a flow chart of a method for evaluating an illumination condition in a face image according to an embodiment of the present invention. As shown in FIG. 1, the method comprises the steps of: decomposing a face image into illumination feature components and face feature components (step S1); extracting predetermined areas in the face image (step S2); calculating a maximum luminance feature, a minimum luminance feature and an illumination direction feature according to illumination feature components in the predetermined areas (step S3); and evaluating the illumination condition in the face image according to the maximum luminance feature, the minimum luminance feature and the illumination direction feature (step S4).

In step S1, a face image is decomposed into illumination feature components and face feature components.

If an input image is a grayscale image, the input image may be directly used as a face image. If an input image is a color image, the input image shall be converted into a grayscale image and then used as a face image, for example, an RGB image is converted into a grayscale image or an HSV image to extract V-channel components and the like.

An illumination feature component of each pixel point in the face image indicates an illumination intensity of the pixel point. The illumination feature component of each pixel point multiplied by reflectivity is equal to a grayscale value of the pixel point. Illumination feature components reflect external illumination and occlusion shadows of objects.

Face feature components indicate features related to a face in the face image, and do not include any feature related to illumination.

The face image is decomposed only into two components, i.e., illumination feature components and face feature components. That is, the two components constitute the entire face image.

The decomposing in step S1 may be implemented using one of a Total Variation (TV) model, a Logarithm Total Variation (LTV) model and a Self Quotient Image (SQI) model.

Specifically, the face image may be decomposed into original illumination feature components and original face feature components, as the illumination feature components and the face feature components, directly using one of the above models.

In another embodiment, the face image may be decomposed into original illumination feature components and original face feature components using one of a TV model, a LTV model and a self quotient image model. Then, the original illumination feature components are multiplied by a mean value of the original face feature components, to obtain the illumination feature components; and the original face feature components are divided by the mean value of the original face feature components, to obtain the face feature components.

Dividing the original face feature components by the mean value of the original face feature components is essentially normalizing the face feature components. As mentioned previously, the face image is decomposed only into two components, and the two components constitute the entire human face. Thus, after the face feature components are normalized, the original illumination feature components are multiplied by a mean value of the original face feature components accordingly, to obtain the illumination feature components. In this way, when a comparison on different face images is performed, all face feature components as one component are normalized, such that illumination feature components as another component are more comparable, making it easy to perform a comparison on the illumination feature components.

Figure 2:
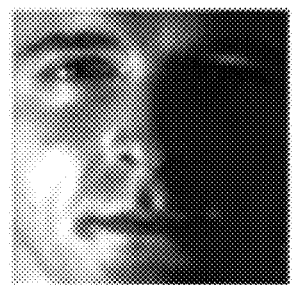
FIG. 2 shows an example of a grayscale face image.
Figure 3:
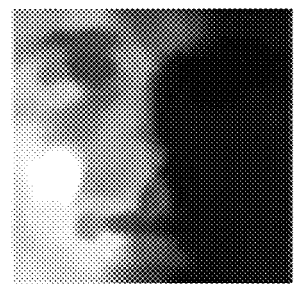
FIG. 3 shows illumination feature components decomposed from FIG. 2.
Figure 4:
FIG. 4 shows face feature components decomposed from FIG. 2.

FIG. 2 shows an example of a grayscale face image. FIG. 3 shows illumination feature components decomposed from FIG. 2. FIG. 4 shows face feature components decomposed from FIG. 2.

In step S2, predetermined areas in the face image are extracted.

Since the interested areas of a face recognition system are not the entire face image, but are central areas taking eyes, nose and mouth as cores, the evaluation of the illumination condition as a preceding stage will also be focused on the above central areas.

Figure 5:
FIG. 5 shows examples of areas.

The predetermined areas in step S2 include four areas covering eyes, nose and mouth. FIG. 5 shows examples of the areas. It should be noted that the four areas as shown in FIG. 5 are only examples. The predetermined areas are only required to be capable of covering eyes, nose and mouth. It is only an example that the number of the areas is 4. When a total of such four areas as upper, lower, left and right areas exist, subsequent detection of an illumination direction feature is facilitated. Since it is assumed that the face is flat, an illumination direction can be judged from a difference between adjacent areas.

Both the traditional image processing method and the CNN-based technique can detect the above predetermined areas. For example, two central points of two eyes and two feature points representing mouth corners are first detected, and the four areas as shown in FIG. 5 are outlined using the four points. Hereinafter, the illumination condition in the face image will be evaluated according to the illumination feature components in the predetermined areas. Description is made by taking the four predetermined areas as shown in FIG. 5 as an example.

In step S3, a maximum luminance feature, a minimum luminance feature and an illumination direction feature are calculated according to illumination feature components in the predetermined areas.

Figure 6:
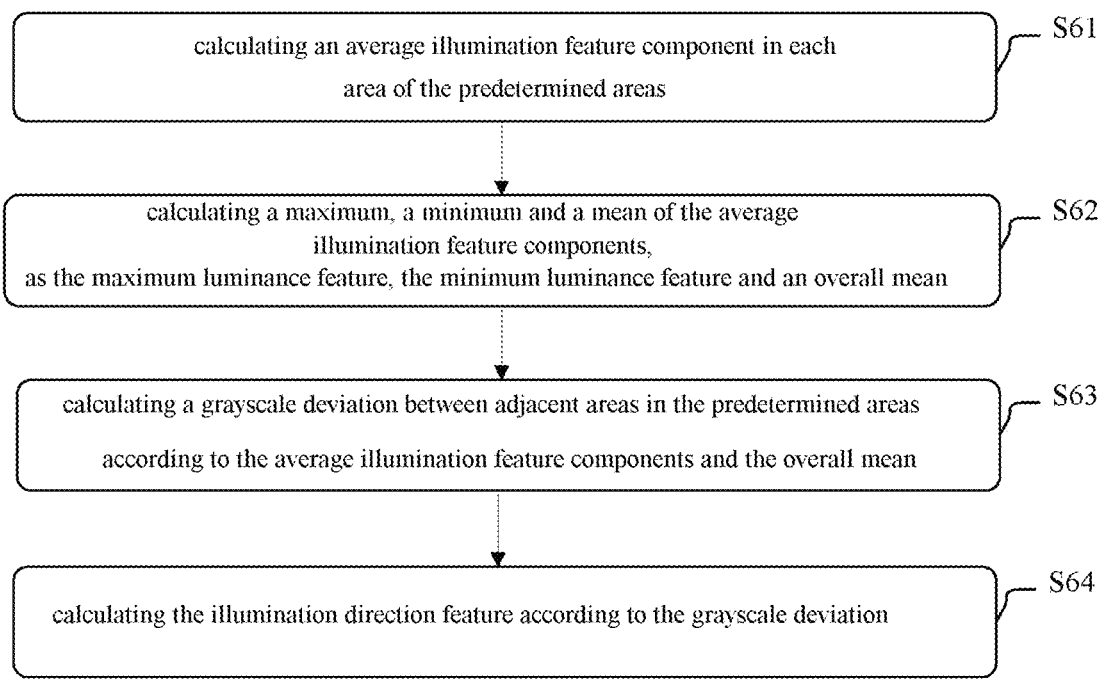
FIG. 6 shows calculation details of step S3.

FIG. 6 shows calculation details of the step S3.

As shown in FIG. 6, in step S61, an average illumination feature component $l_1$-$l_4$ in each area of the predetermined areas is calculated.

In step S62, a maximum $l_{max}$, a minimum $l_{min}$ and a mean $\bar{l}$ of the average illumination feature components $l_1$-$l_4$ are calculated as the maximum luminance feature, the minimum luminance feature and an overall mean.

In step S63, a grayscale deviation $l'_1$-$l'_4$ between adjacent areas in the predetermined areas is calculated according to the average illumination feature components $l_1$-$l_4$ and the overall mean.

A matrix A may be constructed:

$$A = \begin{bmatrix} -1 & 1 & l'_1 \\ -1 & -1 & l'_2 \\ 1 & 1 & l'_3 \\ 1 & -1 & l'_4 \end{bmatrix}$$

where $$l'_i = \frac{l_i}{\bar{l}} - 1, i = 1, 2, 3, 4.$$

In step 64, the illumination direction feature $l_a$, $l_e$ is calculated according to the grayscale deviation $l'_1$-$l'_4$.

A plane equation $Ax=0$, where $x=[a, b, c]$, shall satisfy $\|x\|=1$.

If x is calculated, values of a, b, c are obtained.

It is assumed that $d=-(al'_1+bl'_1+cl'_1)$.

If $d<0$, then $l_a=a$ and $l_e=-b$.

If $d>0$, then $l_a=-a$ and $l_e=b$.

In step S4, the illumination condition in the face image is evaluated according to the maximum luminance feature, the minimum luminance feature and the illumination direction feature.

The evaluation criterion is:

if the maximum luminance feature $l_{max}$ is less than a low luminance threshold $TH_l$, evaluating the illumination condition in the face image as a low luminance condition;

if the minimum luminance feature $l_{min}$ is greater than a high luminance threshold $TH_h$, evaluating the illumination condition in the face image as a high luminance condition;

if at least one of the absolute value of $l_a$ and the absolute value of $l_e$ of the illumination direction feature is greater than respective direction thresholds $TH_a$ and $TH_e$, evaluating the illumination condition in the face image as a lateral light condition.

Examples of the threshold are $TH_l=0.2$, $TH_h=0.8$, $TH_a=0.2$, $TH_e=0.2$.

If it is assumed that the face is a cylindrical, the illumination direction feature may also be calculated according to a grayscale deviation using other methods. The corresponding calculation is well-known for those skilled in the art.

In an embodiment, the evaluation result is fed back to a user. The user can for example re-capture a face image.

In an embodiment, the face image in which illumination condition fails to satisfy predetermined conditions is removed. The predetermined conditions include luminance uniformity, direct light or diffusion reflection. Those face images in which illumination conditions are evaluated as the high luminance condition, the low luminance condition and the lateral light condition are face images failing to satisfy the predetermined conditions.

Hereinafter, an apparatus for evaluating an illumination condition in a face image according to an embodiment of the present invention will be described with reference to FIG. 7.

Figure 7:
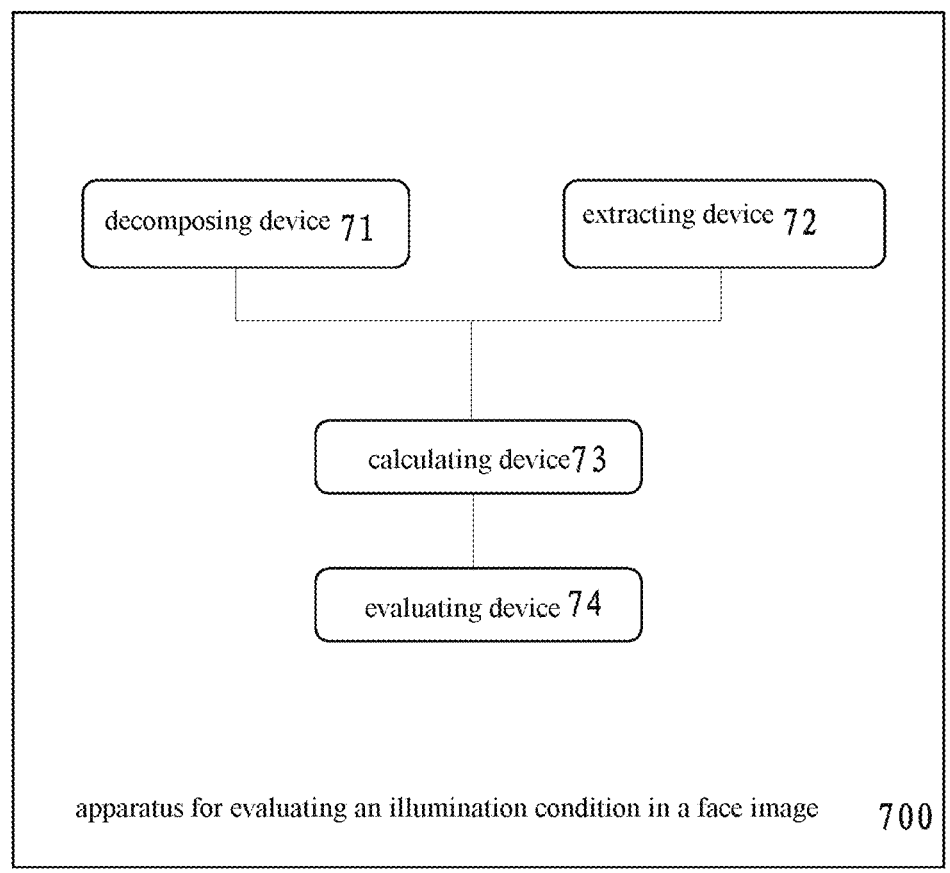
FIG. 7 shows a structural block diagram of an apparatus for evaluating an illumination condition in a face image according to an embodiment of the present invention.

FIG. 7 shows a structural block diagram of an apparatus for evaluating an illumination condition in a face image according to an embodiment of the present invention. As shown in FIG. 7, an apparatus 700 for evaluating an illumination condition in a face image according to an embodiment of the present invention comprises: a decomposing device 71 configured to decompose a face image into illumination feature components and face feature components; an extracting device 72 configured to extract predetermined areas in the face image; a calculating device 73 configured to calculate a maximum luminance feature, a minimum luminance feature and an illumination direction feature according to illumination feature components in the predetermined areas; and an evaluating device 74 configured to evaluate the illumination condition in the face image according to the maximum luminance feature, the minimum luminance feature and the illumination direction feature.

In an embodiment, the decomposing device 71 is further configured to decompose the face image into original illumination feature components and original face feature components, as the illumination feature components and the face feature components, using one of a total variation TV model, a logarithm total variation LTV model and a self quotient image model.

In an embodiment, the decomposing device 71 is further configured to decompose the face image into original illumination feature components and original face feature components using one of a TV model, a LTV model and a self quotient image model; multiplying the original illumination feature components by a mean value of the original face feature components, to obtain the illumination feature components; dividing the original face feature components by the mean value of the original face feature components, to obtain the face feature components.

In an embodiment, the predetermined areas include four areas covering eyes, nose and mouth.

In an embodiment, the calculating device 73 is further configured to calculate an average illumination feature component in each area of the predetermined areas; calculate a maximum, a minimum and a mean of the average illumination feature components, as the maximum luminance feature, the minimum luminance feature and an overall mean; calculate a grayscale deviation between adjacent areas in the predetermined areas according to the average illumination feature components and the overall mean; calculate the illumination direction feature according to the grayscale deviation.

In an embodiment, the evaluating device 74 is further configured to, if the maximum luminance feature is less than a low luminance threshold, evaluate the illumination condition in the face image as a low luminance condition; if the minimum luminance feature is greater than a high luminance threshold, evaluate the illumination condition in the face image as a high luminance condition; if an absolute value of the illumination direction feature is greater than a direction threshold, evaluate the illumination condition in the face image as a lateral light condition.

In an embodiment, the apparatus 700 further comprises a feedback device configured to feed the evaluation result back to a user.

In an embodiment, the apparatus 700 further comprises a removing device configured to remove a face image in which illumination condition fails to satisfy predetermined conditions.

In an embodiment, the predetermined conditions include luminance uniformity, direct light or diffusion reflection.

Since the process included in the apparatus 700 according to the present invention are similar to the process in the respective steps comprised in the method described above, detailed description of these processes is omitted here for the sake of conciseness.

Figure 8:
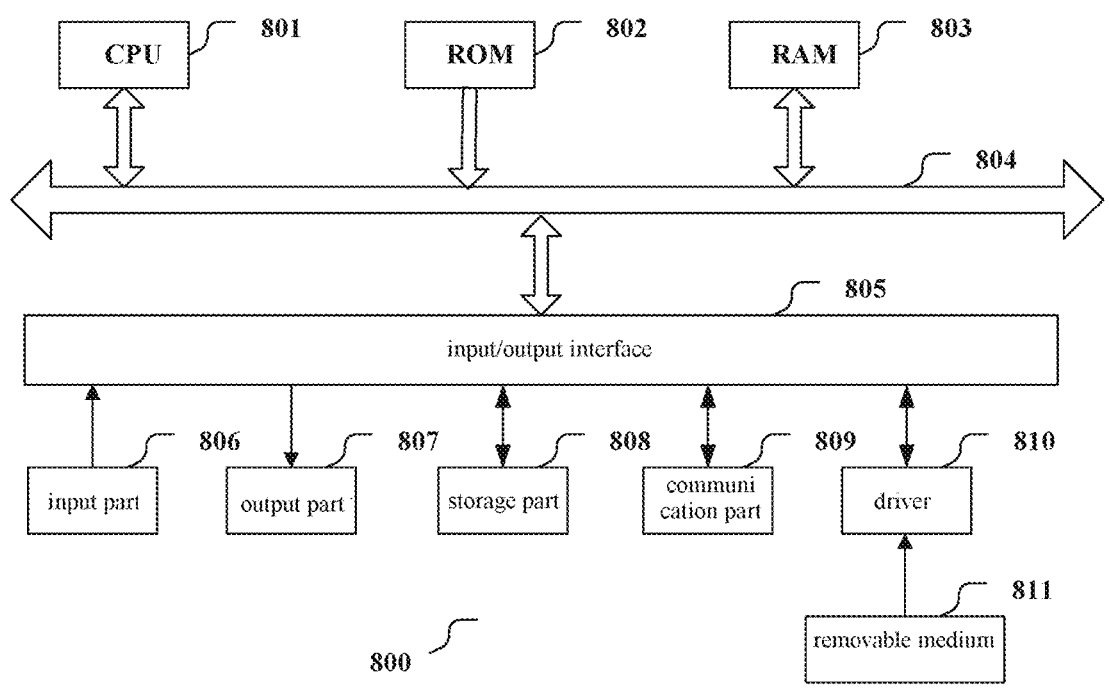
FIG. 8 shows a schematic block diagram of a computer that can be used for implementing the method and the apparatus according to the embodiments of the present invention.

In addition, it should also be noted herein that, the respective constituent devices and units in the above apparatus may be configured through software, firmware, hardware or a combination thereof. The specific means or manner that can be used for the configuration are well-known to those skilled in the art, and will not be repeatedly described herein. In a case where the configuration is implemented through software or firmware, programs constituting the software are installed from a storage medium or a network to a computer having a dedicated hardware structure (e.g. the universal computer 800 as shown in FIG. 8). The computer, when installed with various programs, is capable of implementing various functions and the like.

FIG. 8 shows a schematic block diagram of a computer that can be used for implementing the method and the apparatus according to the embodiments of the present invention.

In FIG. 8, a central processing unit (CPU) 801 performs various processes according to programs stored in a read-only memory (ROM) 802 or programs loaded from a storage part 808 to a random access memory (RAM) 803. In the RAM 803, data needed when the CPU 801 performs various processes and the like is also stored, as needed. The CPU 801, the ROM 802 and the RAM 803 are connected to each other via a bus 804. An input/output interface 805 is also connected to the bus 804

The following components are connected to the input/output interface 805: an input part 806 (including keyboard, mouse and the like), an output part 807 (including display such as cathode ray tube (CRT), liquid crystal display (LCD) and the like, and loudspeaker and the like), a storage part 808 (including hard disc and the like), and a communication part 809 (including network interface card such as LAN card, modem and the like). The communication part 809 performs communication processing via a network such as the Internet. A driver 810 may also be connected to the input/output interface 805, as needed. As needed, a removable medium 811, such as a magnetic disc, an optical disc, a magnetic optical disc, a semiconductor memory and the like, may be installed in the driver 810, such that a computer program read therefrom is installed in the memory part 808 as needed.

In the case where the foregoing series of processing is implemented through software, programs constituting the software are installed from a network such as the Internet or a memory medium such as the removable medium 811

It should be understood by those skilled in the art that, such a memory medium is not limited to the removable mediums 811 as shown in FIG. 8 in which programs are stored and which are distributed separately from the apparatus to provide the programs to users. Examples of the removable medium 811 include a magnetic disc (including floppy disc (registered trademark)), a compact disc (including compact disc read-only memory (CD-ROM) and digital video disk (DVD)), a magnetic optical disc (including mini disc (MD) (registered trademark)), and a semiconductor memory. Alternatively, the memory mediums may be hard discs included in the ROM 802 and the memory part 808, in which programs are stored and which are distributed together with the apparatus containing them to users.

The present invention further provides a program product having machine readable instruction codes stored thereon. The instruction codes, when read and executed by a machine, can implement the foregoing methods according to the embodiments of the present invention.

Accordingly, a storage medium for carrying the foregoing program product having computer readable instruction codes stored thereon is also included in the present invention. The storage medium includes, but is not limited to, a soft disc, an optical disc, a magnetic optical disc, a memory card, a memory stick and the like.

In the foregoing description of specific embodiments of the present invention, the features described and/or shown for an implementation mode may be used in one or more other implementation modes in the same or similar way, or combined with those in the other implementation modes, or replace those in the other implementation modes.

It should be emphasized that the terms "comprise/include", as used herein, refer to the presence of a feature, an element, a step or an assembly but do not preclude the presence or addition of one or more other features, elements, steps or assemblies.

In addition, the methods of the present invention are not limited to be implemented according to the time order described in the description, but may also be implemented sequentially, in parallel or independently according to another time order. Thus, the implementation order of the methods described in the description is not to be construed as limiting the technical scope of the present invention.

While the present invention has been disclosed above with reference to descriptions of the specific embodiments of the present invention, it should be understood that all of the aforementioned embodiments and examples are exemplary but not limiting. A variety of modifications, improvements or equivalents can be devised by those skilled in the art within the spirit and scope of the appended claims. The modifications, improvements or equivalents should also be considered as being included in the scope of protection of the present invention.

According to an aspect of the present invention, a method for evaluating an illumination condition in a face image comprises: decomposing a face image into illumination feature components and face feature components; extracting predetermined areas in the face image; calculating a maximum luminance feature, a minimum luminance feature and an illumination direction feature according to illumination feature components in the predetermined areas; and evaluating the illumination condition in the face image according to the maximum luminance feature, the minimum luminance feature and the illumination direction feature. The decomposing comprises: decomposing the face image into original illumination feature components and original face feature components, as the illumination feature components and the face feature components, using one of a total variation TV model, a logarithm total variation LTV model and a self quotient image model. The decomposing comprises: decomposing the face image into original illumination feature components and original face feature components using one of a total variation TV model, a logarithm total variation LTV model and a self quotient image model; multiplying the original illumination feature components by a mean value of the original face feature components, to obtain the illumination feature components; and dividing the original face feature components by the mean value of the original face feature components, to obtain the face feature components. The predetermined areas include four areas covering eyes, nose and mouth. The calculating comprises: calculating an average illumination feature component in each area of the predetermined areas; calculating a maximum, a minimum and a mean of the average illumination feature components, as the maximum luminance feature, the minimum luminance feature and an overall mean; calculating a grayscale deviation between adjacent areas in the predetermined areas according to the average illumination feature components and the overall mean; and calculating the illumination direction feature according to the grayscale deviation. The evaluating comprises: if the maximum luminance feature is less than a low luminance threshold, evaluating the illumination condition in the face image as a low luminance condition; if the minimum luminance feature is greater than a high luminance threshold, evaluating the illumination condition in the face image as a high luminance condition; and if an absolute value of the illumination direction feature is greater than a direction threshold, evaluating the illumination condition in the face image as a lateral light condition. The evaluating the illumination condition in the face image further comprises feeding an evaluation result back to a user. The evaluating the illumination condition in the face image further comprises removing a face image in which an illumination condition fails to satisfy predetermined conditions. The predetermined conditions include luminance uniformity, direct light or diffusion reflection.

According to another aspect of the present invention, an apparatus for evaluating an illumination condition in a face image comprises: a decomposing device configured to decompose a face image into illumination feature components and face feature components; an extracting device configured to extract predetermined areas in the face image; a calculating device configured to calculate a maximum luminance feature, a minimum luminance feature and an illumination direction feature according to illumination feature components in the predetermined areas; and an evaluating device configured to evaluate the illumination condition in the face image according to the maximum luminance feature, the minimum luminance feature and the illumination direction feature. The decomposing device is further configured to: decompose the face image into original illumination feature components and original face feature components, as the illumination feature components and the face feature components, using one of a total variation TV model, a logarithm total variation LTV model and a self quotient image model. The decomposing device is further configured to: decompose the face image into original illumination feature components and original face feature components using one of a total variation TV model, a logarithm total variation LTV model and a self quotient image model; multiply the original illumination feature components by a mean value of the original face feature components, to obtain the illumination feature components; and divide the original face feature components by the mean value of the original face feature components, to obtain the face feature components. The predetermined areas include four areas covering eyes, nose and mouth. The calculating device is further configured to: calculate an average illumination feature component in each area of the predetermined areas; calculate a maximum, a minimum and a mean of the average illumination feature components, as the maximum luminance feature, the minimum luminance feature and an overall mean; calculate a grayscale deviation between adjacent areas in the predetermined areas according to the average illumination feature components and the overall mean; and calculate the illumination direction feature according to the grayscale deviation. The evaluating device is further configured to: if the maximum luminance feature is less than a low luminance threshold, evaluate the illumination condition in the face image as a low luminance condition; if the minimum luminance feature is greater than a high luminance threshold, evaluate the illumination condition in the face image as a high luminance condition; and if an absolute value of the illumination direction feature is greater than a direction threshold, evaluate the illumination condition in the face image as a lateral light condition. The apparatus further comprises a feedback device configured to feed the evaluation result back to a user. The apparatus further comprises a removing device configured to remove a face image in which an illumination condition fails to satisfy predetermined conditions. The predetermined conditions include luminance uniformity, direct light or diffusion reflection.

The invention claimed is:

1. A method by a computing apparatus to evaluate an illumination condition in a face image, comprising:
    decomposing a face image among a plurality of face images into illumination feature components and face feature components, the decomposing including,
        decomposing the face image into original illumination feature components and original face feature components, and
        obtaining the illumination feature components and the face feature components based on a mean value of the original face feature components;
    extracting determined areas in the face image;
    calculating a maximum luminance feature, a minimum luminance feature and an illumination direction feature, according to the decomposed illumination feature components in the determined areas; and
    evaluating an illumination condition in the face image according to the maximum luminance feature, the minimum luminance feature and the illumination direction feature.

2. The method according to claim 1, wherein
    the face image is decomposed into original illumination feature components and original face feature components, using any one or combination of a total variation model, a logarithm total variation model, or a self quotient image model.

3. The method according to claim 2, wherein the obtaining of the illumination feature components and the face feature components based on the mean value of the original face feature components comprises:

multiplying the original illumination feature components by a mean value of the original face feature components, to obtain the illumination feature components; and dividing the original face feature components by the mean value of the original face feature components, to obtain the face feature components.

4. The method according to claim 1, wherein the determined areas include four areas to cover eyes, nose and mouth.

5. The method according to claim 1, wherein the calculating comprises:

calculating an average illumination feature component in at least two of the determined areas;

calculating a maximum, a minimum and a mean of the average illumination feature components, as the maximum luminance feature, the minimum luminance feature and an overall mean;

calculating a grayscale deviation between adjacent areas in the at least two determined areas according to the average illumination feature components and the overall mean; and calculating the illumination direction feature according to the grayscale deviation.

6. The method according to claim 1, wherein the evaluating comprises:

if the maximum luminance feature is less than a low luminance threshold, evaluating the illumination condition in the face image as a low luminance condition;

if the minimum luminance feature is greater than a high luminance threshold, evaluating the illumination condition in the face image as a high luminance condition; and if an absolute value of the illumination direction feature is greater than a illumination direction threshold, evaluating the illumination condition in the face image as a lateral light condition.

7. The method according to claim 1, further comprising: feeding an evaluation result corresponding to the evaluated illumination condition back to a user.

8. The method according to claim 1, further comprising: removing the face image from the plurality of face images in which the evaluated illumination condition fails to satisfy determined conditions.

9. The method according to claim 8, wherein the determined conditions include any one or combination of luminance uniformity, direct light, or diffusion reflection.

10. An apparatus to evaluate an illumination condition in a face image, comprising:

a memory, and a processor coupled to the memory and the processor to execute, decompose a face image among a plurality of face images into illumination feature components and face feature components, the decomposing including, decomposing the face image into original illumination feature components and original face feature components, and obtaining the illumination feature components and the face feature components based on a mean value of the original face feature components;

extract determined areas in the face image;

calculate a maximum luminance feature, a minimum luminance feature and an illumination direction feature according to the decomposed illumination feature components in the determined areas; and evaluate an illumination condition in the face image according to the maximum luminance feature, the minimum luminance feature and the illumination direction feature.

11. The apparatus according to claim 10, wherein the processor is further to:

decompose the face image into original illumination feature components and original face feature components, using any one or combination of a total variation TV model, a logarithm total variation LTV model, or a self quotient image model.

12. The apparatus according to claim 11, wherein the processor is further to:

multiply the original illumination feature components by a mean value of the original face feature components, to obtain the illumination feature components; and divide the original face feature components by the mean value of the original face feature components, to obtain the face feature components.

13. The apparatus according to claim 10, wherein the determined areas include four areas to cover eyes, nose and mouth.

14. The apparatus according to claim 10, wherein the processor is further to:

calculate an average illumination feature component in at least two of the determined areas;

calculate a maximum, a minimum and a mean of the average illumination feature components, as the maximum luminance feature, the minimum luminance feature and an overall mean;

calculate a grayscale deviation between adjacent areas in the at least two determined areas according to the average illumination feature components and the overall mean; and calculate the illumination direction feature according to the grayscale deviation.

15. The apparatus according to claim 10, wherein the processor is further to:

if the maximum luminance feature is less than a low luminance threshold, evaluate the illumination condition in the face image as a low luminance condition;

if the minimum luminance feature is greater than a high luminance threshold, evaluate the illumination condition in the face image as a high luminance condition; and if an absolute value of the illumination direction feature is greater than a illumination direction threshold, evaluate the illumination condition in the face image as a lateral light condition.

16. The apparatus according to claim 10, wherein the processor is further to feed an evaluation result corresponding to the evaluated illumination condition back to a user.

17. The apparatus according to claim 10, wherein the processor is further to remove the face image from among the plurality of face images in which the evaluated illumination condition fails to satisfy determined conditions.

18. The apparatus according to claim 17, wherein the determined conditions include any one or combination of luminance uniformity, direct light, or diffusion reflection.

19. A non-transitory computer readable storage medium storing a program which, when being executed, causes the computing apparatus to implement the method according to claim 1.

* * * * *